United States Patent
Fousse et al.

(10) Patent No.: US 7,786,859 B2
(45) Date of Patent: Aug. 31, 2010

(54) LOCATOR APPARATUS AND METHOD USING THAT APPARATUS

(76) Inventors: David E. Fousse, 9872 E. Pinyon Pine Dr., Tucson, AZ (US) 85748; Roy Froid, 1017 Chula Vista Ter., Sunnyvale, CA (US) 94086

( * ) Notice: Subject to any disclaimer, the term of this patent is extended or adjusted under 35 U.S.C. 154(b) by 300 days.

(21) Appl. No.: 11/669,864

(22) Filed: Jan. 31, 2007

(65) Prior Publication Data

US 2007/0225825 A1    Sep. 27, 2007

Related U.S. Application Data

(60) Provisional application No. 60/763,592, filed on Jan. 31, 2006.

(51) Int. Cl.
*G08B 1/08*    (2006.01)
(52) U.S. Cl. .............. 340/539.3; 340/539.1; 340/568.1; 340/572.1
(58) Field of Classification Search .............. 340/539.3, 340/539.1, 539.11, 539.14, 539.15, 568.1, 340/568.5, 568.6, 571, 572.1, 5.92, 825.36, 340/825.49, 10.1, 10.3, 10.33, 10.34
See application file for complete search history.

(56) References Cited

U.S. PATENT DOCUMENTS

| | | | | |
|---|---|---|---|---|
| 3,848,231 A | * | 11/1974 | Wootton | 340/524 |
| 5,894,264 A | * | 4/1999 | Zimmermann | 340/388.1 |
| 6,255,944 B1 | * | 7/2001 | Addy | 340/539.3 |
| 7,064,662 B2 | * | 6/2006 | Goggin | 340/539.32 |
| 2001/0004235 A1 | * | 6/2001 | Maloney | 340/568.1 |
| 2002/0105443 A1 | * | 8/2002 | Flick | 340/988 |
| 2003/0048196 A1 | * | 3/2003 | Lieberman | 340/825.49 |
| 2003/0071728 A1 | | 4/2003 | McDonald et al. | |
| 2004/0194833 A1 | | 10/2004 | Townsend et al. | |
| 2005/0195606 A1 | | 9/2005 | Henoch | |
| 2006/0176167 A1 | * | 8/2006 | Dohrmann | 340/506 |

* cited by examiner

*Primary Examiner*—Toan N Pham
*Assistant Examiner*—Kerri McNally
(74) *Attorney, Agent, or Firm*—Dale F. Regelman; Quarles & Brady LLP

(57) ABSTRACT

An apparatus to locate an article is disclosed. The apparatus comprises a host device comprising a transmitter, and a client device attached to the article. The client device comprises a client controller, a receiver interconnected with the client controller, a battery interconnected with both the client controller and the receiver. The controller and the receiver alternate between an inactive mode and an active mode.

20 Claims, 17 Drawing Sheets

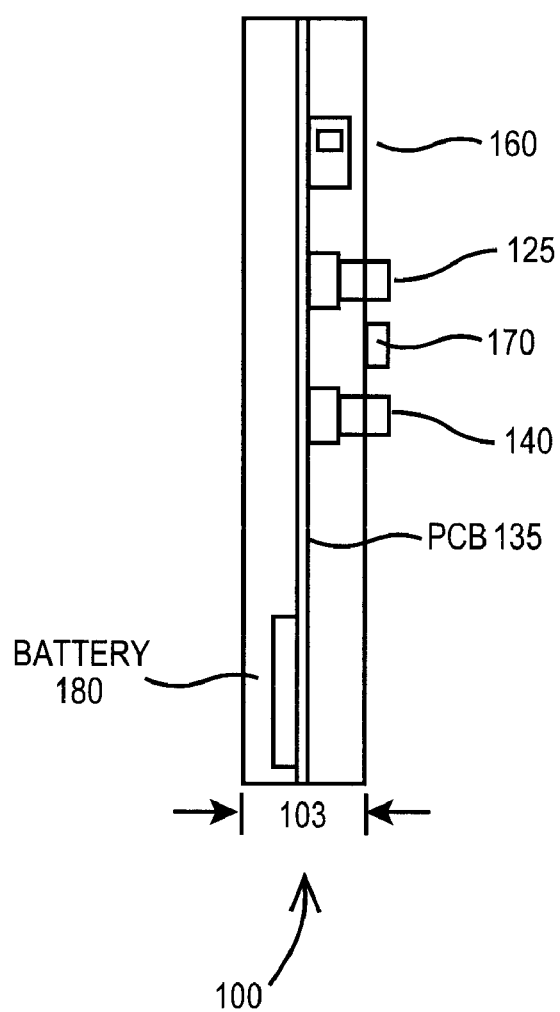

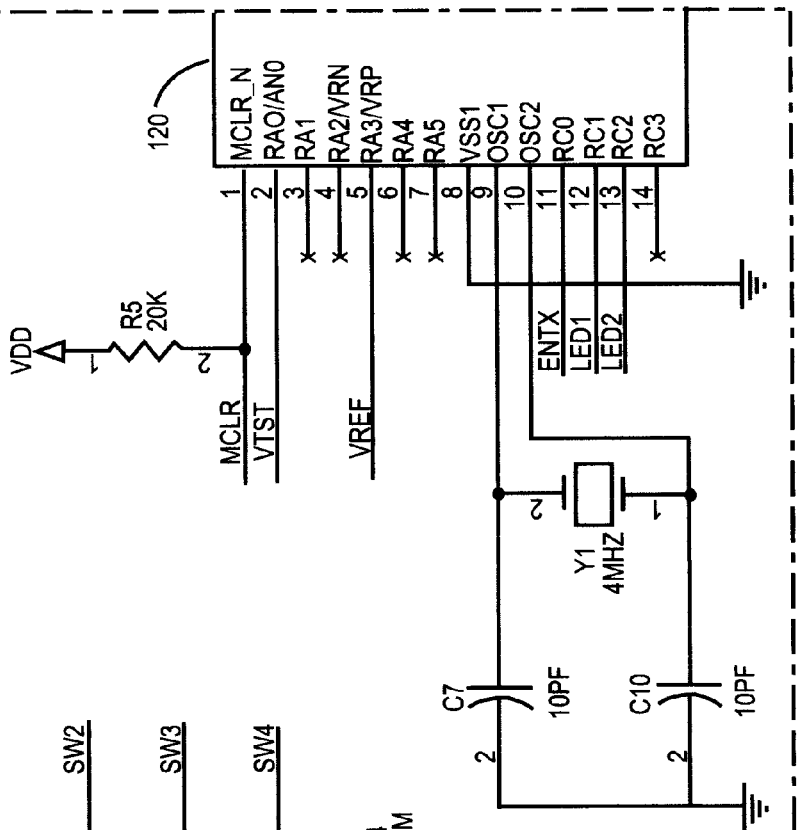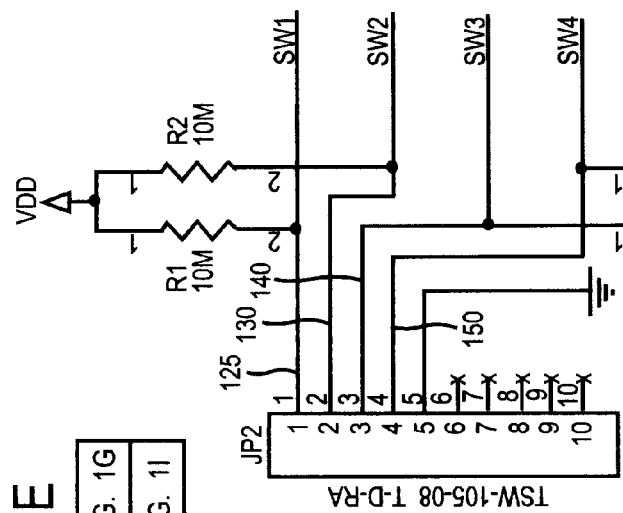
FIG. 1F
FIG. 1E
| FIG. 1F | FIG. 1G |
|---|---|
| FIG. 1F | FIG. 1H | FIG. 1I |

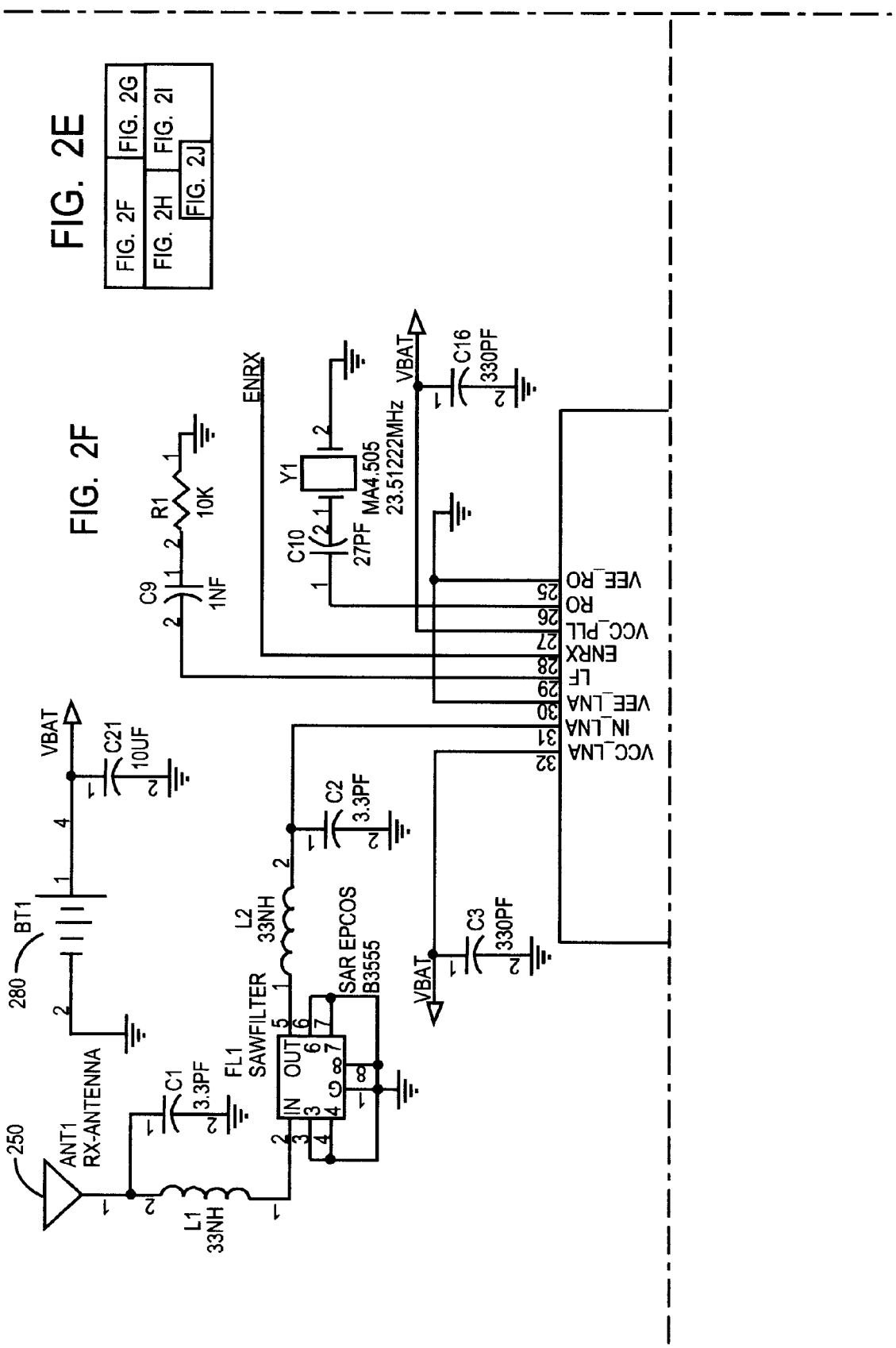

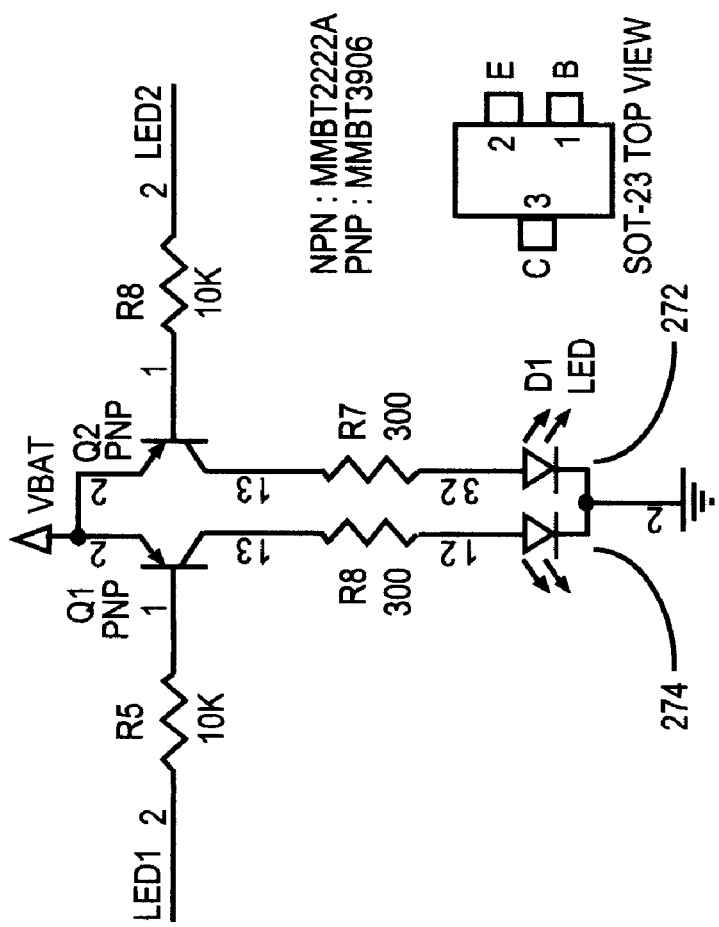
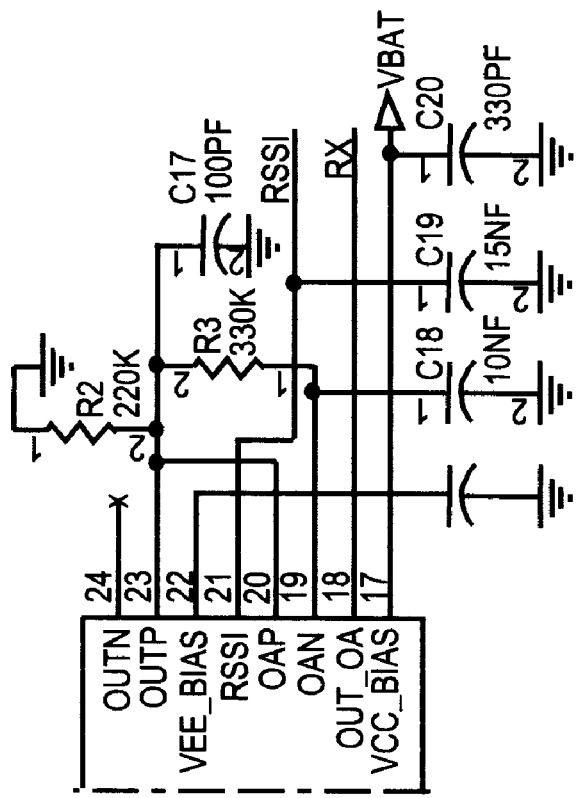
FIG. 21

LOCATOR APPARATUS AND METHOD USING THAT APPARATUS

CROSS-REFERENCE TO RELATED APPLICATION

This Application claims priority from a U.S. Provisional Application having Ser. No. 60/763,592, which is hereby incorporated by reference herein.

BACKGROUND OF THE INVENTION

Locator systems comprising a transmitter and one or more receivers are known in the art. Typically, a receiver is attached to an article, such as and without limitation, one or more keys disposed on a key chain, a device to adjust the settings for one or more electronic devices, and the like.

Prior art devices suffer from a common deficiency, namely limited battery life in the receivers. If the battery disposed in a receiver device fails, then that receiver device cannot detect incoming signals, and therefore, is rendered useless. What is needed is an apparatus, and a method using that apparatus, wherein the receiver devices comprise an enhanced useful lifetime resulting from reduced consumption of battery power.

SUMMARY OF THE INVENTION

The present invention cures a deficiency inherent in those prior locator systems, namely the short useful battery lifetime of the battery disposed in the receiver apparatus. Applicants' invention comprising an apparatus to locate an article. That apparatus comprises a host device comprising a transmitter, and a client device attached to the article. The client device comprises a client controller, a receiver interconnected with the client controller, a battery interconnected with both the client controller and the receiver. The controller and the receiver alternate between an inactive mode and an active mode.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' locator apparatus and method utilize emissions under the IEEE Standard 802.15 ("the IEEE Standard") for Personal Area Networks. The IEEE Standard allows addressable signals to be provided to one or more of over 1 billion different receivers using a 64-bit extended addressing method. In addition, using RFID coding, more than 250,000,000 transmitting devices can be used without duplication of even a single receiver address.

Figure 1A:
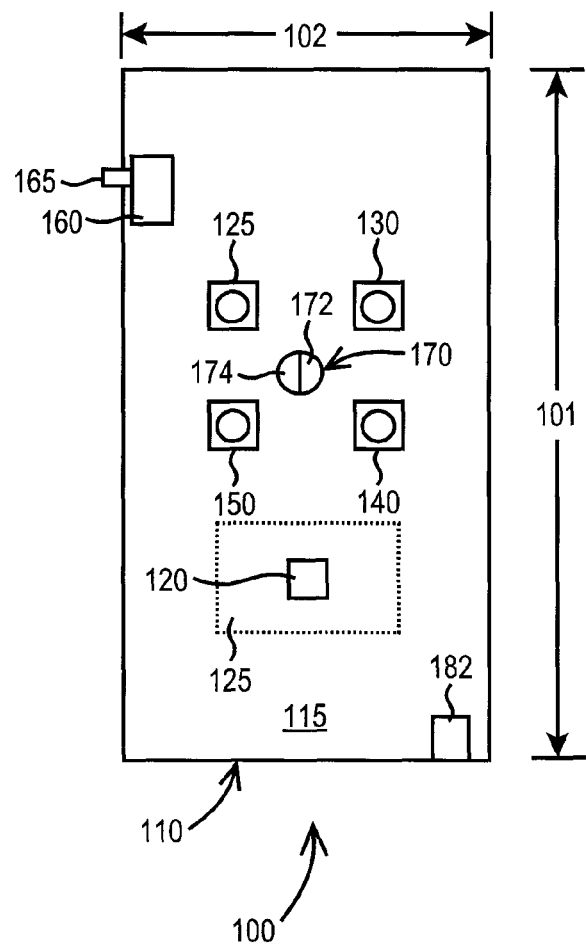
FIG. 1A illustrated the front of Applicants' host locator device.
Figure 1B:
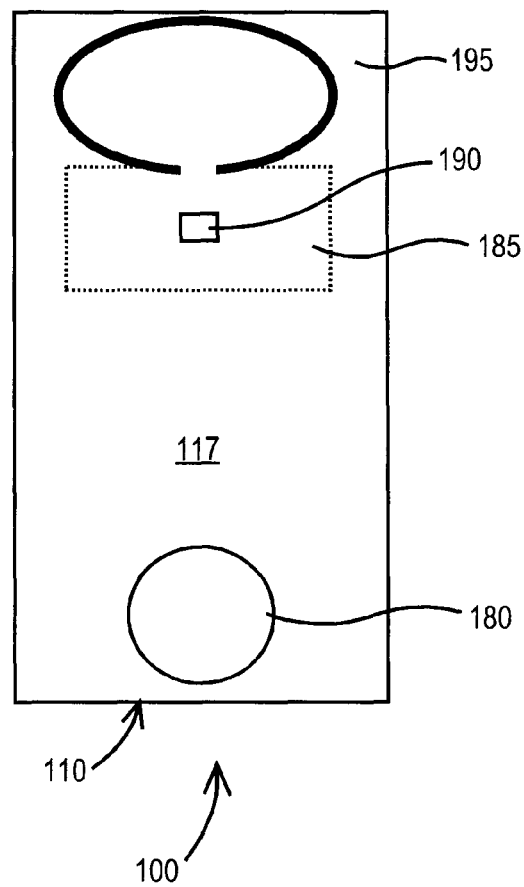
FIG. 1B illustrates the rear of Applicants' host locator device.
Figure 2A:
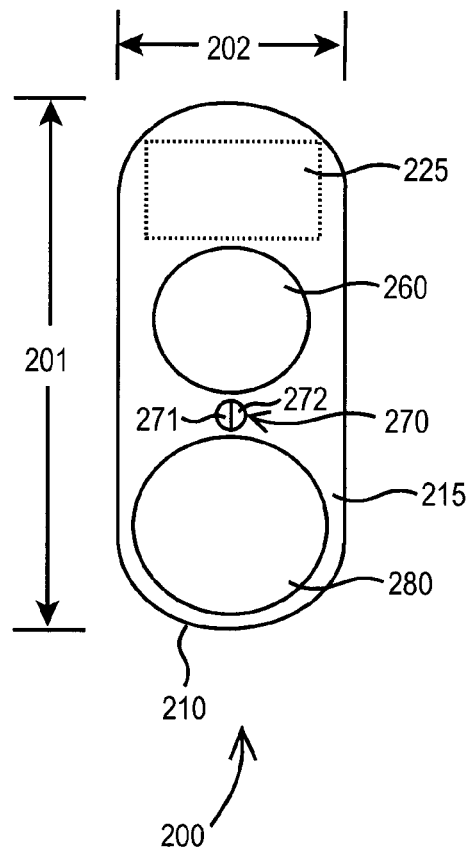
FIG. 2A illustrated the front of Applicants' client locator device.
Figure 2B:
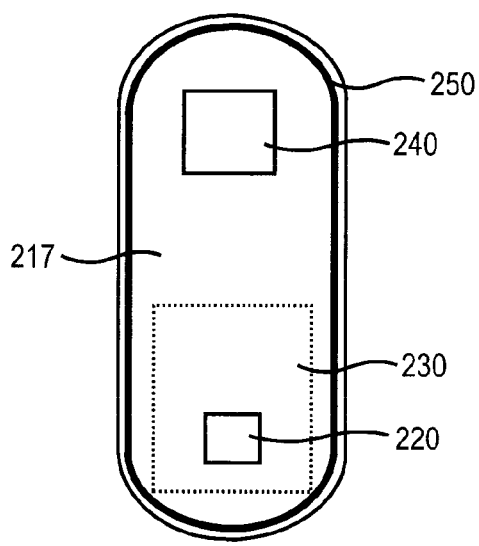
FIG. 2B illustrates the rear of Applicants' client locator device.

Applicants' locating apparatus comprises host device 100 (FIGS. 1A, 1B, 1C) and client device 200 (FIGS. 2A, 2B). Using Applicants' apparatus and certain embodiments of Applicants' method, the one or more client devices have a useful lifetime between battery changes of up to five (5) years. In other embodiments of Applicants' method, the one or more client devices have a useful lifetime between battery changes of up to ten (10) years.

The invention is described in preferred embodiments in the following description with reference to the Figures, in which like numbers represent the same or similar elements. Referring now to FIGS. 1A 1B, and 1C, host device 100 comprises housing 110, controller 120 disposed within controller component area 125 disposed within housing 110, transmitter 190 disposed within transmitter component area 185 disposed within housing 110, and antenna 195 disposed within housing 110. The illustrated embodiment of FIG. 1A shows front surface 115 of housing 110.

Housing 110 has length 101, width 102, and thickness 103. In certain embodiments, length 101 is between about 3 inches and about 5 inches. In certain embodiments, length 101 is about 4 inches. Width 102 is between about 1.5 inch and about 3 inches. In certain embodiments, width 102 is about 2 inches.

Thickness 103 is between about 0.4 inches and 1 inch. In certain embodiments, thickness 103 is about 0.6 inches.

Light emitting device 170 is disposed on surface 110. In certain embodiments, light-emitting device 170 comprises one or more light emitting diodes ("LEDs"). In the illustrated embodiment of FIG. 1A, light-emitting device 170 comprises a first LED 172 and a second LED 174. In certain embodiments, first LED 172 is capable of emitting visible light comprising a first color selected from the group consisting of red, green, and blue. In certain embodiments, second LED 174 is capable of emitting visible light comprising a second color selected from the group consisting of red, green, and blue, wherein the first color differs from the second color. In certain embodiments, the first color is green and the second color is red.

Switch 160 is partially disposed within housing 110, such that a moveable member 165 extends outwardly from housing 110. Movable member 165 can be slidingly moved from a first position to a second position. When moveable member 165 is disposed in the first position, power is not provided to controller 120 or to transmitter 190. When moveable member is disposed in the second position, power is provided to controller 120 and to transmitter 190.

A plurality of buttons are disposed on, or through, surface 115. In the illustrated embodiment of FIG. 1A, apparatus 100 comprises four buttons 125, 130, 140, and 150. Using Applicants' apparatus and method, each of the (N) buttons disposed on Applicants' host device is associated with a different remote client device. Activating an (i)th find button causes Applicants' host device to transmit a signal comprising an (i)th unique identifier assigned to an (i)th client device.

In certain embodiments, one or more of buttons 125, 130, 140, and/or 150, comprise push-button assemblies having a first position and a second position. Each one of buttons 125, 130, 140, and 150, can be moved between a first, i.e. "off", position and a second, i.e. "on", position. In certain embodiments, one or more of buttons 125, 130, 140, and/or 150, comprise any of a variety of push-button assemblies known in the art. In certain embodiments, one or more of buttons 125, 130, 140, and/or 150, comprise a touch screen element.

The illustrated embodiment of FIG. 1B shows rear surface 117 of housing 110, wherein rear surface 117 opposes front surface 115 on housing 110. Antenna 195 is disposed within housing 110 and is operatively interconnected with transmitter 190. In certain embodiments, transmitter 190 comprises an integrated circuit sold in commerce by Melexis under the name Transmitter IC TH72011. In certain embodiments, transmitter 190 generates emissions having a frequency between about 433.000 MHz and about 433.990 MHz.

In certain embodiments, host device 100 utilizes utility power. In these embodiments apparatus 100 comprises a power input section that is capable of utilizing utility power having a voltage from about 90 volts to about 240 volts AC, wherein that AC input power comprises a frequency between about 50 Hertz and about 75 Hertz.

In other embodiments, host device 100 comprises battery 180. In certain embodiments, battery 180 is selected from the group consisting of a CR2032 battery, a CR2430 battery, and a CR2450 battery.

Figure 1D:
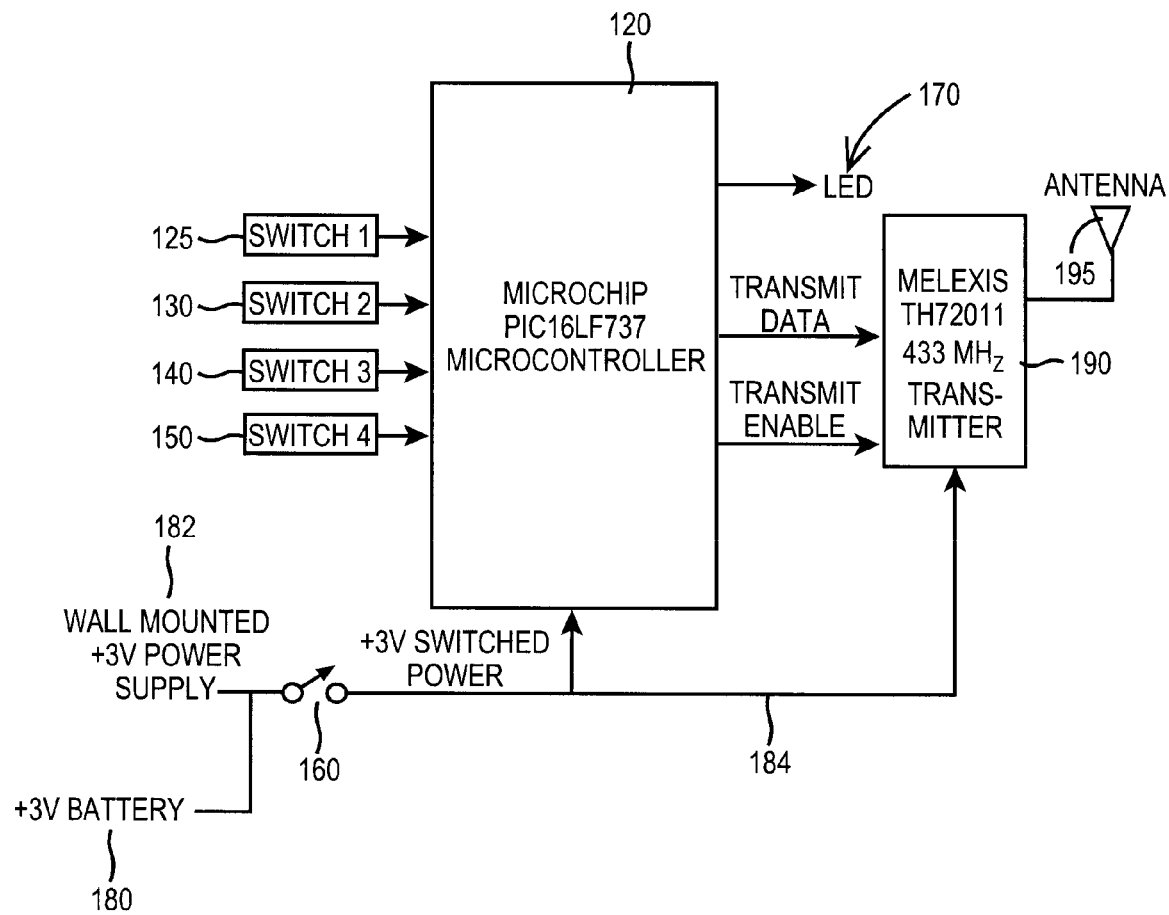
FIG. 1D is a block diagram showing communication links and power bus disposed in Applicants' host locator device.
Figure 1G:
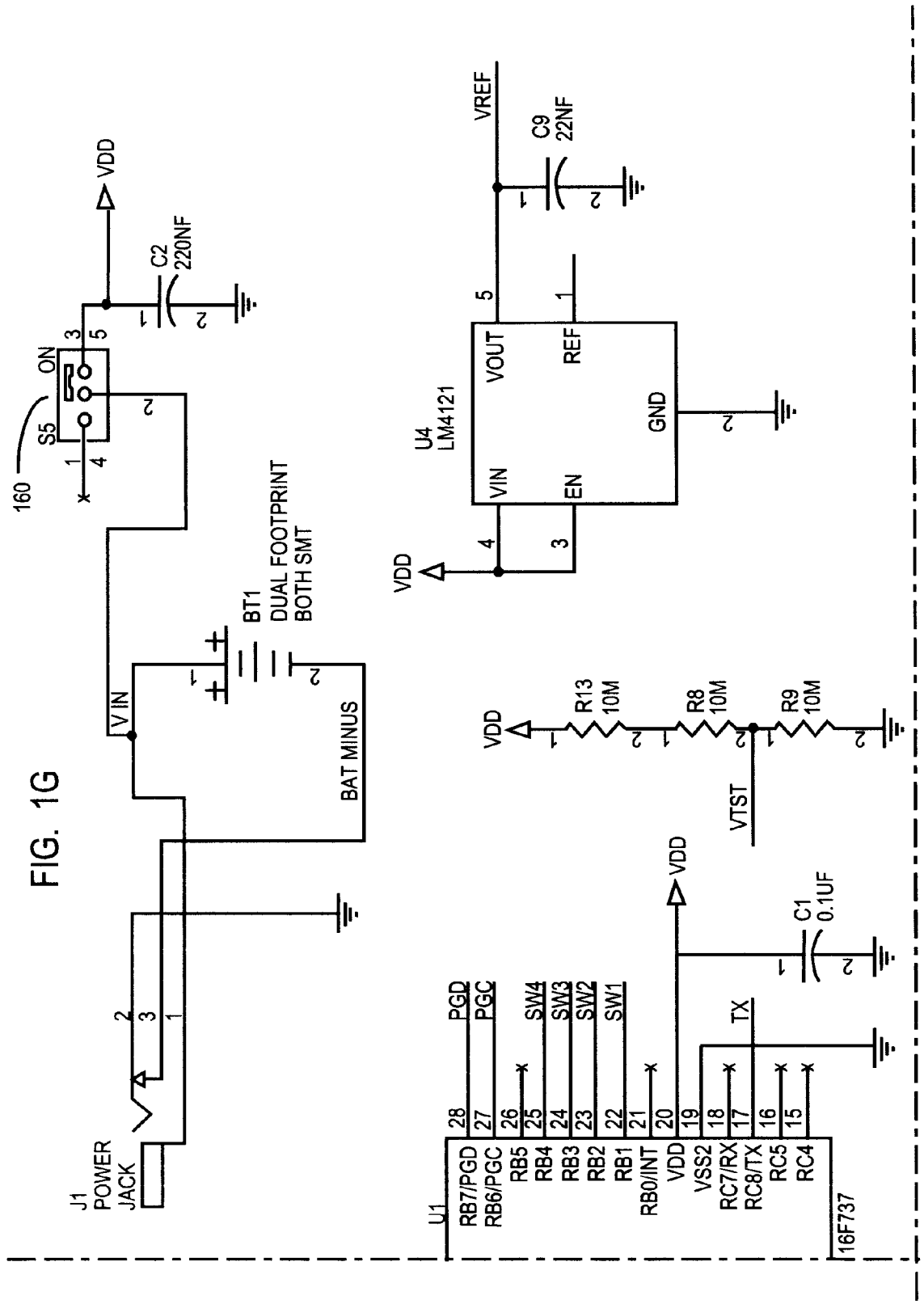
FIG. 1C is cross-sectional view of Applicants' host locator device'
FIG. 1E is a circuit diagram showing the components and circuitry disposed in Applicants' host locator device, wherein FIGS. 1F, 1G, 1H, and 1I in combination comprise FIG. 1E.
Figure 1H:
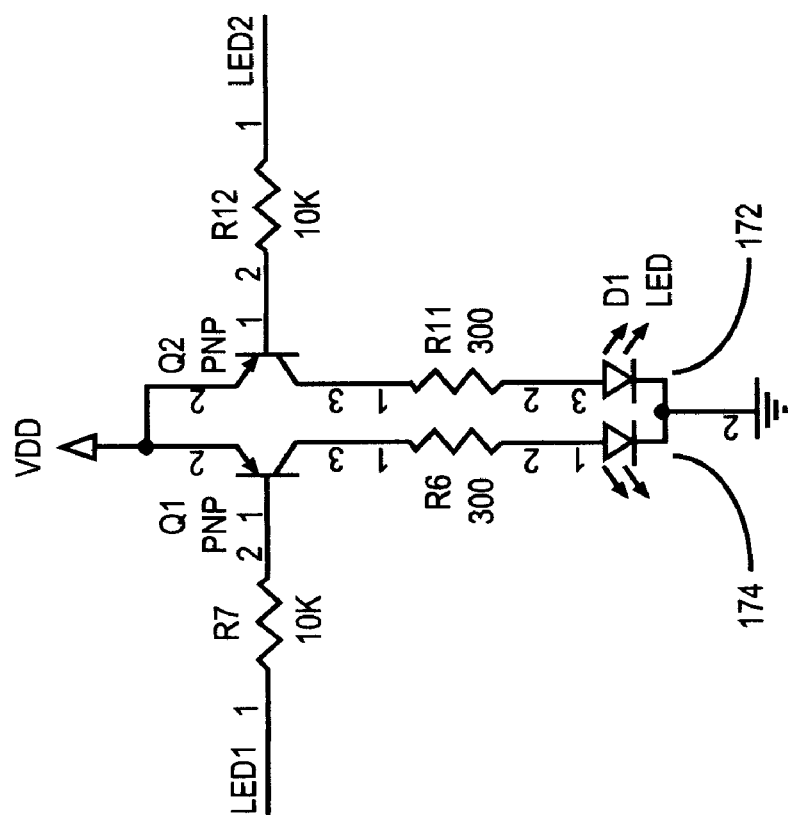
Figure 1I:
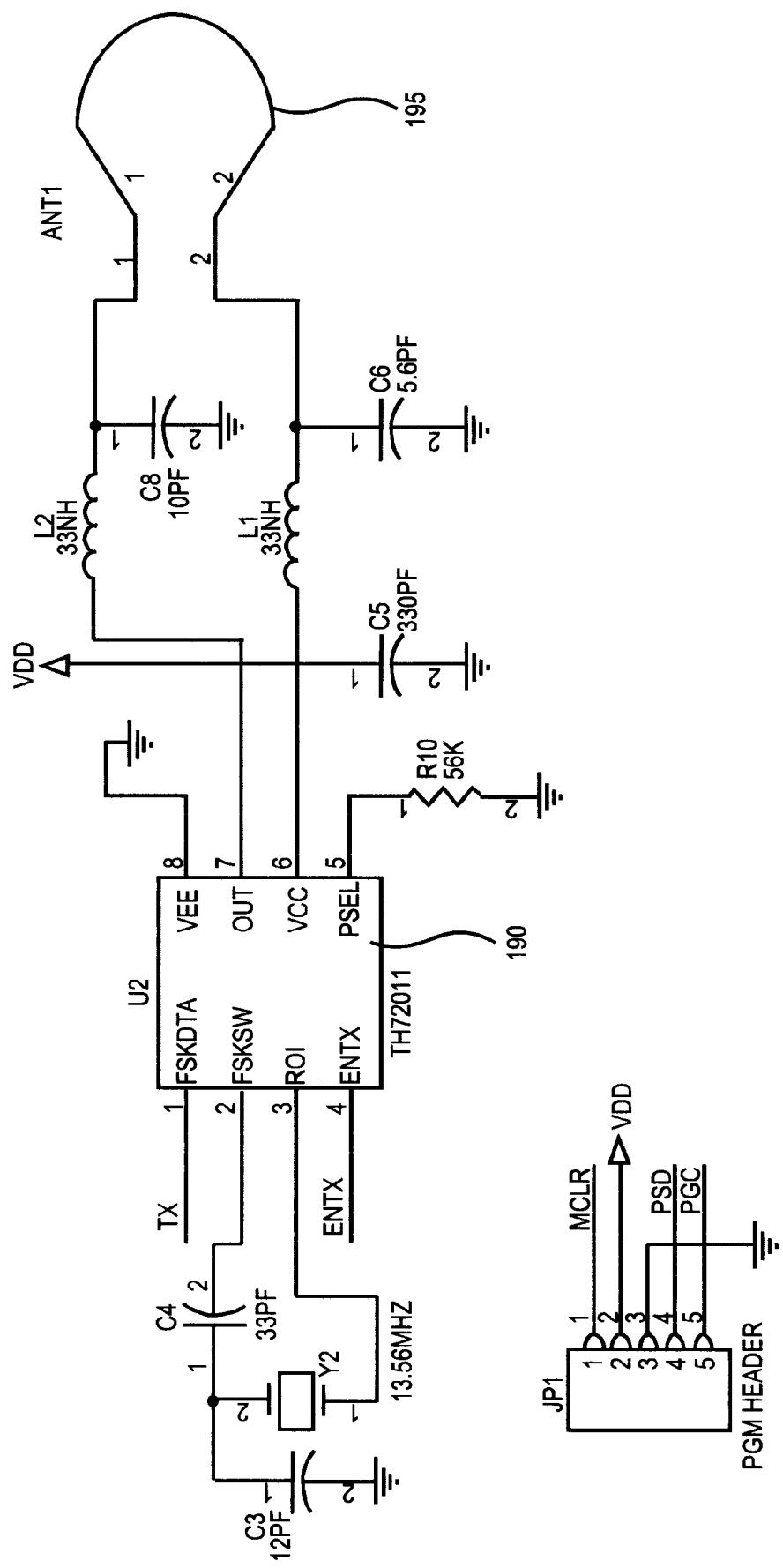

FIG. 1D shows switch 125, switch 130, switch 140, and switch 150, in communication with controller 120. Controller 120 is in further communication with transmitter 190. When one of switches 125, 130, 140, or 150, is activated, that activated switch provides an input signal to controller 120. Controller 120 then provides a data signal to transmitter 190, wherein that data signal comprises the unique identifier assigned to a client-receiving device. Controller 120 further provides an activation signal which causes transmitter to power up, receive the data signal, and emit a wireless signal comprising the unique identifier assigned to a client-receiving device.

A wall mounted power supply connected to power jack 182, and/or internal battery 180, provides power to switch 160. When switch 160 is closed, power is supplied via power bus 184 to controller 120 and transmitter 190. Controller 120 provides power to LED 170 in accord with the method recited in FIGS. 3 and 4 herein. As those skilled in the art will appreciate, wall mounted power supply 182 can be plugged into a socket interconnected with a utility power system, wherein that utility power system provides input utility power, as described herein.

In certain embodiments, battery 180 provides DC power at about +3 volts or greater. In certain embodiments, battery 180 comprises a rechargeable battery. In certain embodiments, battery 180 comprises a plurality of individual battery cells.

Referring now to FIGS. 1C and 1E, circuit board 135 is disposed within housing 110. In certain embodiments, host device 100 comprises circuitry 105 shown in FIG. 1E disposed on circuit board 135.

Figure 2C:
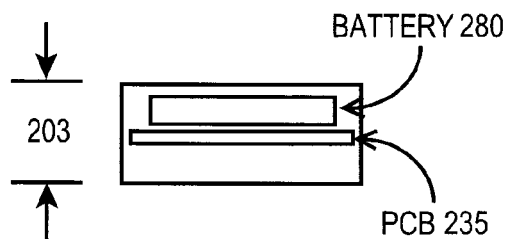
FIG. 2C is cross-sectional view of Applicants' client locator device'

Referring now to FIGS. 2A, 2B, and 2C, Applicants' client device 200 comprises housing 210, controller 220 disposed in controller component area 230, receiver 240, antenna 250, first alert device 260, second alert device 270, and battery 280.

In certain embodiments, first alert device 260 comprises an audio device which, when receiving power, emits an audible alert tone. In certain embodiments, that audio comprises a piezoelectric element which upon being energized emits an audible tone. beeper. In other embodiments, that audio device comprises an electromagnet element which upon being energized emits an audible tone.

In certain embodiments, second alert device 270 comprises one or more light emitting devices, such as one or more LEDs, which, when receiving power, display one or more visually-observable lights. In the illustrated embodiment of FIG. 2A, light-emitting device 270 comprises a first LED 272 and a second LED 274. In certain embodiments, first LED 272 is capable of emitting visible light comprising a first color selected from the group consisting of red, green, and blue. In certain embodiments, second LED 274 is capable of emitting visible light comprising a second color selected from the group consisting of red, green, and blue, wherein the first color differs from the second color.

Housing 210 has length 201, width 202, and thickness 203. In certain embodiments, length 201 is between about 2 inches and about 3 inches. In certain embodiments, length 201 is about 2.5 inches. Width 202 is between about 0.5 inch and about 2 inches. In certain embodiments, width 202 is about 1.5 inches. Thickness 203 is between about 0.3 inches and 0.8 inch. In certain embodiments, thickness 203 is about 0.4 inches.

In certain embodiments, receiver 240 comprises an integrated circuit sold by Melexis under the name Melexis TH71102. In certain embodiments, controller 220 comprises an integrated circuit sold in commerce by Texas Instruments under the name TI MSP430. In certain embodiments, battery 280 comprises a battery selected from the group consisting of a CR2032 battery, a CR2430 battery, and a CR2450 battery.

Figure 2D:
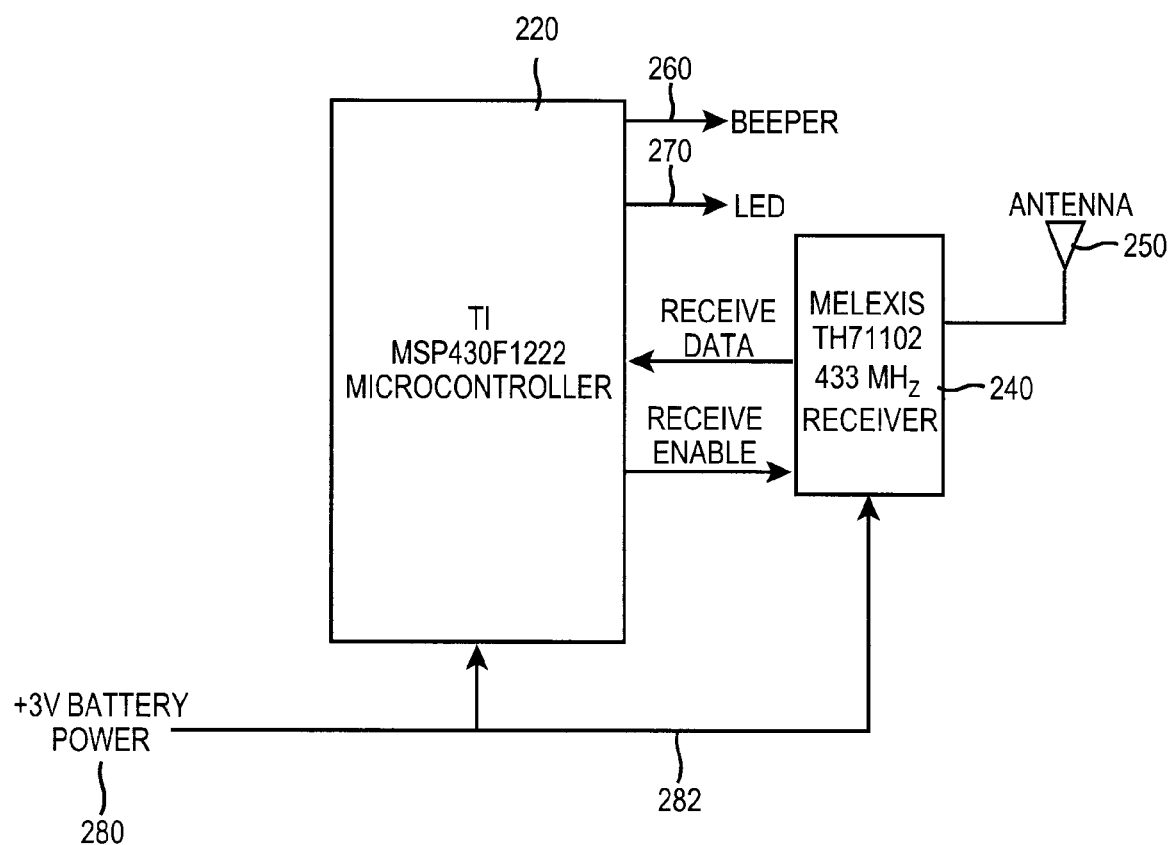
FIG. 2D is a block diagram showing communication links and power bus disposed in Applicants' client locator device.
Figure 2G:
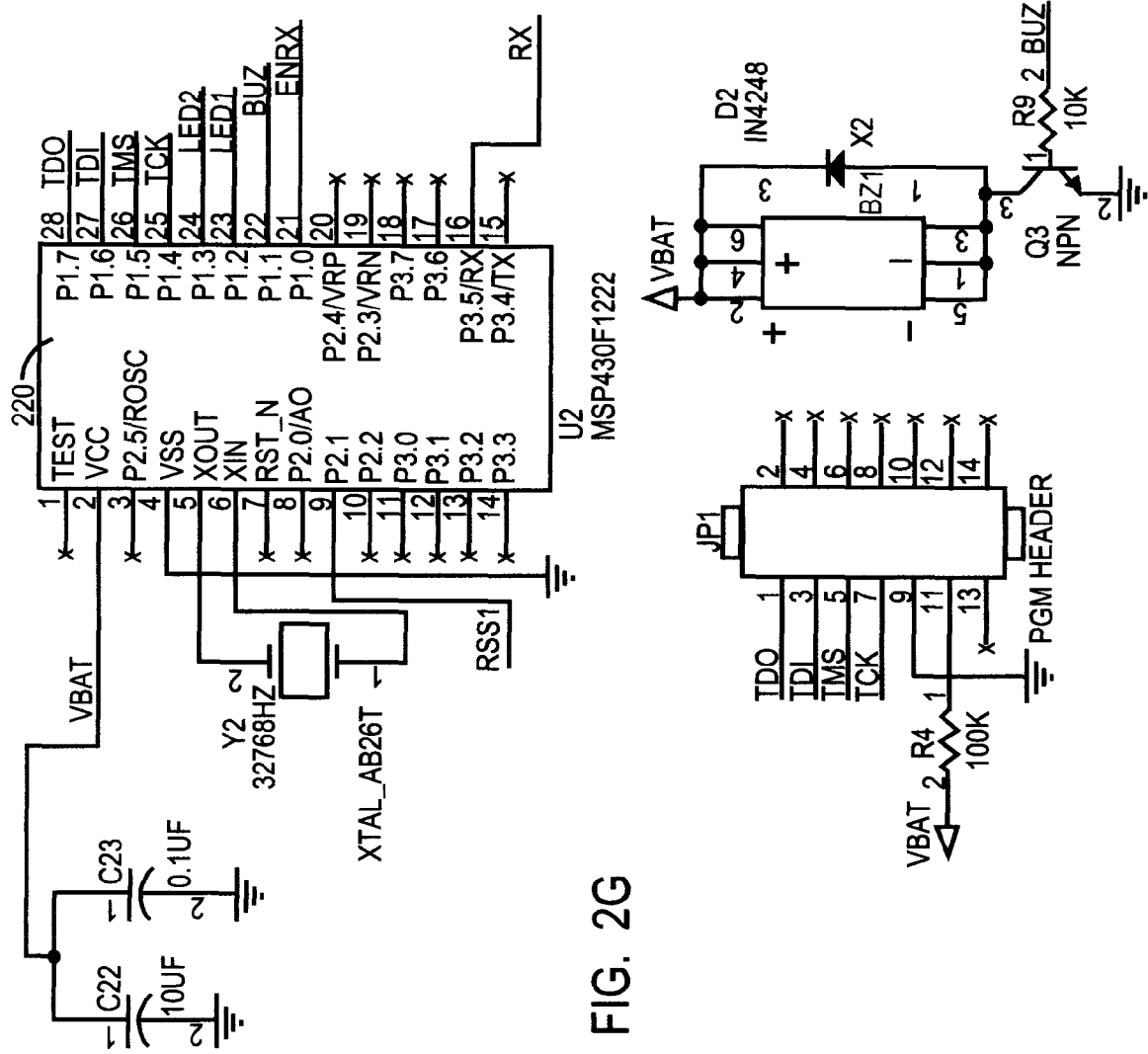
FIG. 2E is a circuit diagram showing the components and circuitry disposed in Applicants' client locator device, wherein FIGS. 2F, 2G, 2H, 2I, and 2J in combination comprise FIG. 2E.
Figure 2H:
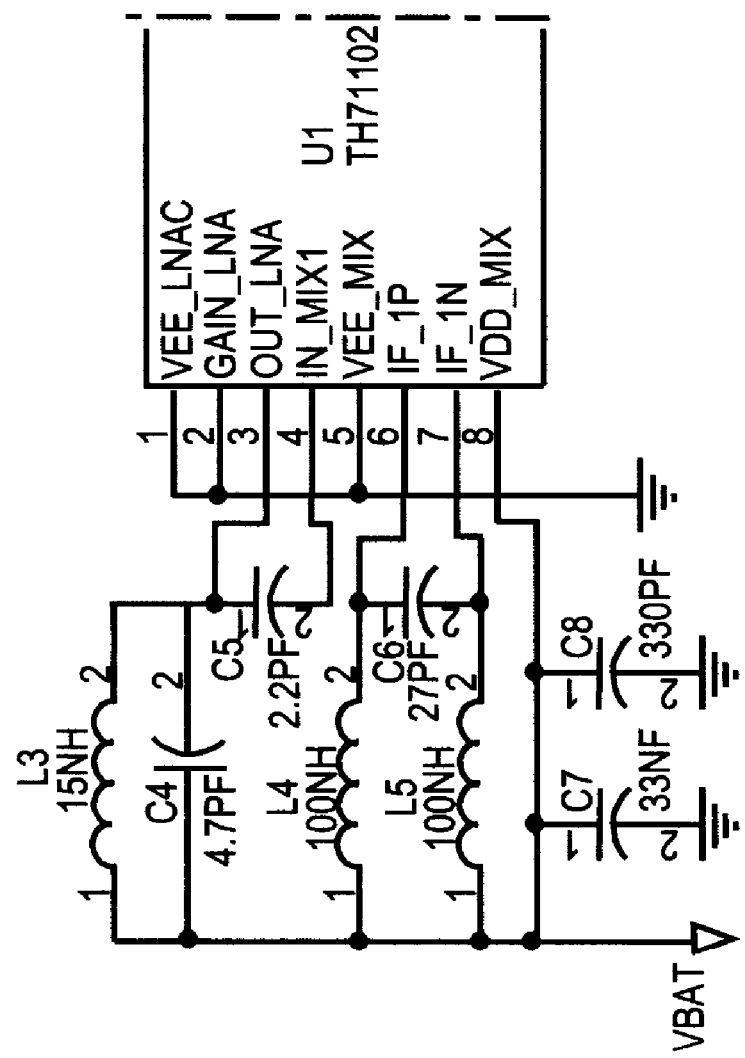
Figure 2J:
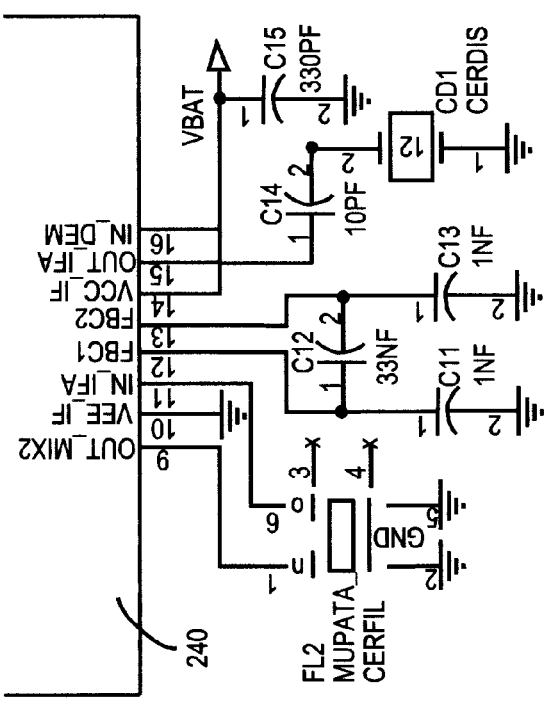

Using Applicants' method, controller 220 and receiver 240 alternate between an inactive mode and an active mode. Referring now to FIG. 2D, battery 280, as described hereinbelow and in FIG. 5, periodically provides +3 volt DC power to controller 220 and receiver 240 via power bus 282. Table 1 recites the lifetimes between battery changes for client device 200 when controller 220 and 240 remain in the inactive mode, wherein controller TI TMS430 draws power at 1.6 micro amps, and wherein receiver Melexis TH71102 draws power at 100 nano amps. Batteries CR2032, 2430, and 2450, comprise Lithium batteries, and are sold in commerce by a variety of vendors including EVERICH, MAXELL, RENATA, and others.

TABLE 1

| BATTERY | BATTERY USEFUL TIME PERIOD (HOURS) | BATTERY USEFUL TIME PERIOD (YEARS) |
| --- | --- | --- |
| CR2032 (210 mA-hr) | 123,529 | 14.1 |
| CR2430 (280 mA-hr) | 164,705 | 18.8 |
| CR2450 (600 mA-hr) | 352,939 | 40.3 |

Controller 220 provides power to audio device 260 and LED assembly 270. Table 2 recites battery lifetimes when controller 220 is continuously operating and wherein an electromagnetic beeper 260 and an LED 270 use a 30 percent duty cycle for 10 seconds, and wherein controller TI TMS430 draws power at 1 mA, LED 270 draws power at 10 mA, and beeper 260 draws power at 90 mA. As described hereinbelow, using Applicants' method neither controller 220 nor receiver 240 operates continuously.

TABLE 2

| BATTERY | BATTERY USEFUL TIME PERIOD (HOURS) |
| --- | --- |
| CR2032 (210 mA-hr) | 6.9 |
| CR2430 (280 mA-hr) | 9.2 |
| CR2450 (600 mA-hr) | 19.8 |

Referring now to FIGS. 2C and 2E, circuit board 235 is disposed within housing 210. In certain embodiments, circuitry 205 is disposed on circuit board 235.

Figure 3:
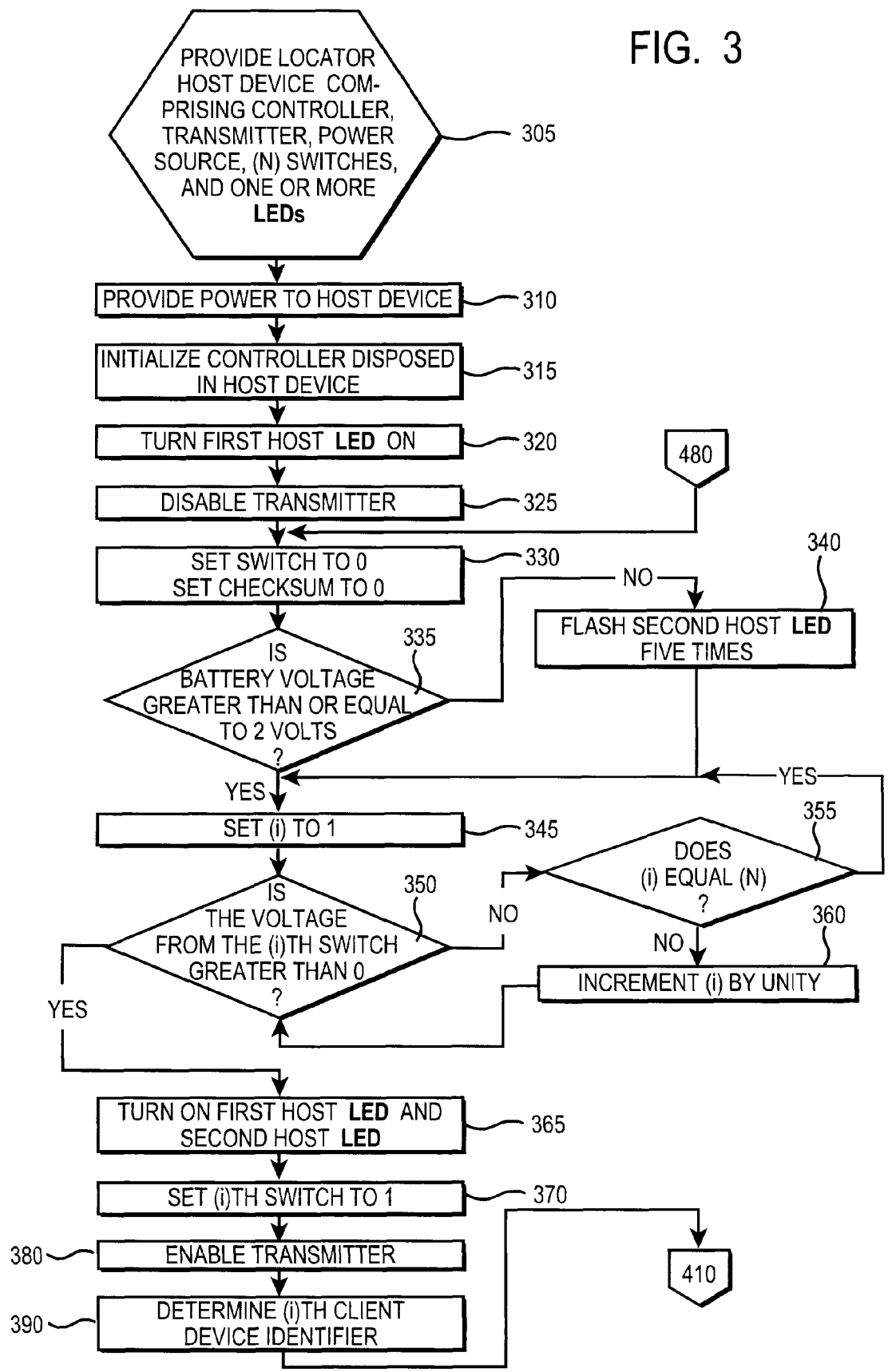
FIG. 3 is a flow chart summarizing certain steps of Applicants' method.

Applicants' invention further comprises a method to locate an article using Applicants' host device 100 and client device 200. Referring now to FIG. 3, in step 305 Applicants' method provides a host device, such as host device 100 (FIGS. 1A, 1B, 1C), wherein that host device comprises a controller, transmitter, (N) find buttons, and one or more light emitting devices.

In step 310, Applicants' method provides power to the host device of step 305. In certain embodiments, Applicants' host device is interconnected in step 310 to a source of utility power and an on-off switch, such as switch 160, is placed in the "on" position. In other embodiments, Applicants' host device comprises a battery and in these embodiments step 310 comprises placing on-off switch, such as switch 160, in the "on" position.

Applicants' method transitions from step 310 to step 315 wherein the method initializes a controller, such as controller 120, disposed in the host device. Applicants' method transitions from step 315 to step 320 wherein the method causes a light emitting device, such as for example LED 172, to emit a green light.

Applicants' method transitions from step 320 to step 325 wherein the method disables the transmitter assembly, such as transmitter 190. Applicants' method transitions from step 325 to step 330 wherein the method sets each of the (N) find buttons disposed in the host device of step 305 to a logic state 0, and sets a checksum value to 0.

Applicants' method transitions from step 330 to step 335 wherein the method determines if the battery voltage is greater than or equal to 2 volts. In certain embodiments, step 325 is performed by controller 120. If the host device of step 310 operates using utility power, then Applicants' method may not include step 335, and Applicants' method transitions from step 330 to step 345.

If Applicants' method determines in step 335 that the battery voltage is not less than 2 volts, then the method transitions from step 335 to step 345. Alternatively, if Applicants' method determines in step 335 that the battery voltage is less than 2 volts, then the method transitions from step 335 to step 340 wherein Applicants' method causes a light emitting device, such as second LED 174, to emit a flashing red light five (5) times. In certain embodiments, step 340 is performed by controller 120.

Applicants' method transitions from step 340 to step 345 wherein the method sets the variable (i) to 1. Applicants' method transitions from step 345 to step 350 wherein the method determines if the voltage from the (i)th find button is greater than 0, i.e. determines if the (i)th find button has been activated, wherein (i) is greater than or equal to 1 and less than or equal to (N). In certain embodiments, step 350 is performed by controller 120.

If Applicant' method determines that the voltage from the (i)th find button is not greater than 0 volts, then the method transitions from step 350 to step 355 wherein the method increments (i) by unity. In certain embodiments, step 355 is performed by controller 120. Applicant' method transitions from step 355 to step 360 wherein Applicant' method determines if (i) equals (N). In certain embodiments, step 360 is performed by controller 120.

If Applicants' method determines in step 355 that (i) does not equal (N), then the method transitions from step 355 to step 360 wherein the method increments (i) by unity. In certain embodiments, step 360 is performed by controller 120. The method transitions from step 360 to step 350 and continues as described herein. If Applicants' method determines in step 360 that (i) does equal (N), then the method transitions from step 355 to step 345 and continues as described herein.

If Applicants' method determines in step 350 that the voltage from the (i)th find button is greater than 0, i.e. the (i)th find button has been activated, then the method transitions from step 350 to step 365 wherein the method activates both the first LED and the second LED. As those skilled in the art will appreciate, causing a red LED and a green LED to emit light results in the emission of a yellow light. In certain embodiments, step 365 is performed by controller 120.

Applicants' method transitions from step 365 to step 370 wherein Applicants' method sets the (i)th find button to logic state 1. In certain embodiments, step 370 is performed by controller 120.

Applicants' method transitions from step 370 to step 380 wherein the method enables the transmitter, such as transmitter 190. In certain embodiments, step 380 is performed by controller 120. Applicants' method transitions from step 380 to step 390 wherein the method determines the client identifier associated with the (i)th find button. In certain embodiments, step 390 is performed by controller 120.

Applicants' method transitions from step 390 to step 410 (FIG. 4) wherein the method determines the value for J, wherein the sleep interval used by the (i)th client device comprises J seconds, and wherein the (i)th client device is associated with the (i)th find button. In certain embodiments, J is 5 seconds, i.e. the client device associated with the (i)th find button utilizes a sleep interval of 5 seconds. In certain embodiments, J is 10 seconds, i.e. the client device associated with the (i)th find button utilizes a sleep interval of 10 seconds. In certain embodiments, step 410 is performed by controller 120.

Applicants' method transitions from step 410 to step 420 wherein the method transmits a wireless signal comprising the (i)th client device identifier of step 390 for J seconds using transmitter 190. In certain embodiments, step 420 is performed by controller 120.

In step 425, Applicants' method determines if a pattern of sequential transmissions will be employed. If the method is not using sequential transitions, then the method transitions from step 425 to step 470. Alternatively, if the method is using sequential transmissions, then the method transitions from step 425 to step 430 wherein the method discontinues transmitting for J/10 seconds. In certain embodiments, step 430 is performed by controller 120.

Applicants' method transitions from step 430 to step 440 wherein the method again transmits a signal comprising the (i)th client device identifier of step 390 for J seconds using transmitter 190. In certain embodiments, step 440 is performed by controller 120. Applicants' method transitions from step 440 to step 450 wherein the method discontinues transmitting for J/10 seconds. In certain embodiments, step 450 is performed by controller 120.

Applicants' method transitions from step 450 to step 460 wherein the method again transmits a signal comprising the (i)th client device identifier of step 390 for J seconds using transmitter 190. In certain embodiments, step 460 is performed by controller 120.

Applicants' method transitions from step 460 to step 470 wherein the method disables the transmitter. In certain embodiments, step 470 is performed by controller 120.

Applicants' method transitions from step 470 to step 480 wherein the method activates the first LED but not the second LED, i.e. LED assembly 170 continuously emits a green light In certain embodiments, step 480 is performed by controller 120. In certain embodiments, steps 470 and 480 are performed concurrently. The method transitions from step 480 to step 330 and continues as described herein.

Figure 5:
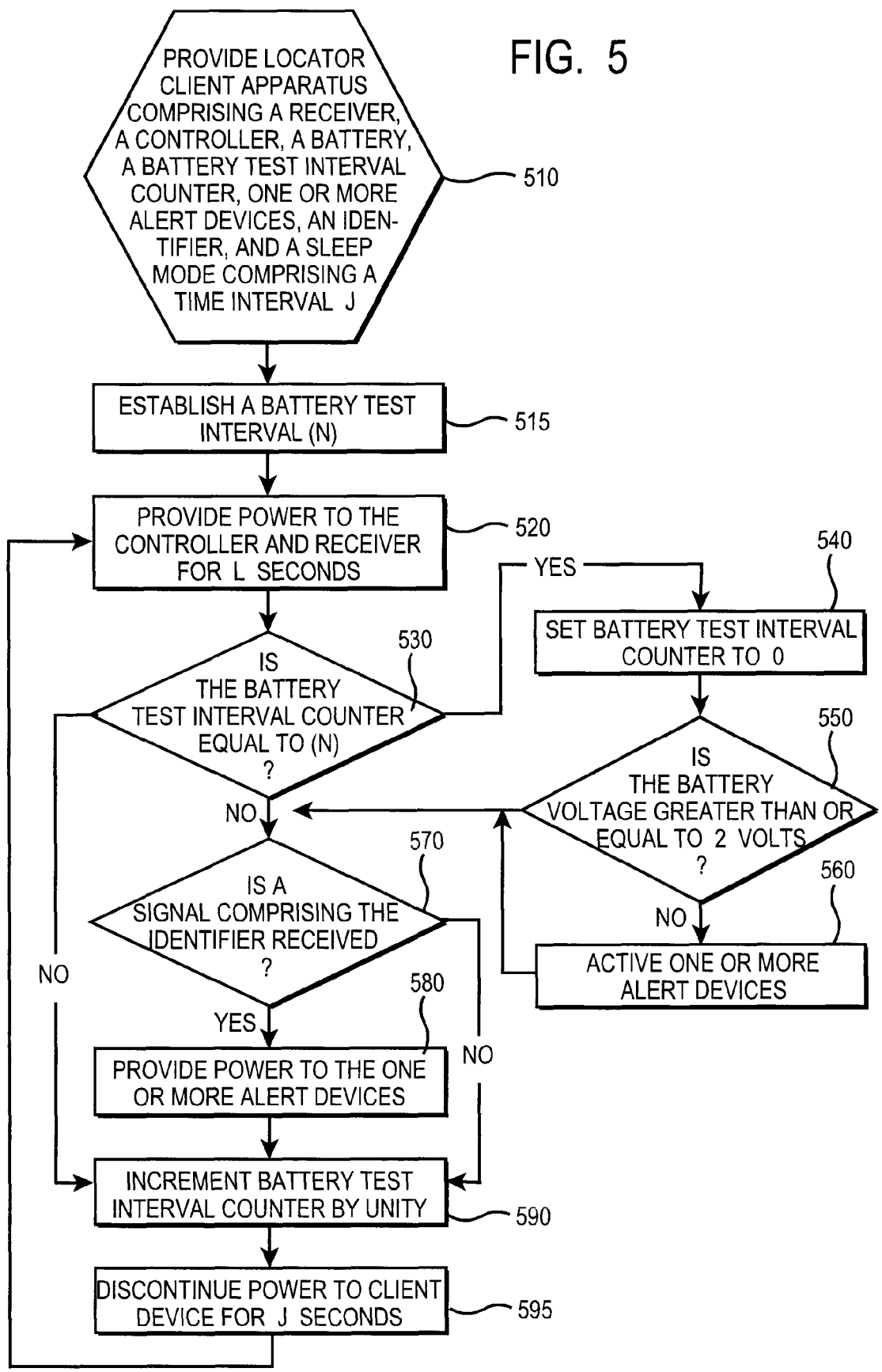
FIG. 5 is a flow chart summarizing additional steps of Applicants' method.

FIG. 5 summarizes the steps of Applicants' method performed by Applicants' client device, such as apparatus 200. Referring now to FIG. 5, in step 510 Applicants' method provides a client device, such as apparatus 200, comprising a receiver, a controller, a battery comprising a voltage, a battery test interval counter, one or more alert devices, an identifier, and a sleep interval comprising J seconds. In certain embodiments, the battery test interval counter is disposed within the controller.

In step 515, the method establishes a battery test interval (N). In certain embodiments, (N) is set to 720. In other embodiments, the battery test interval is less than 720. In other embodiments, the battery test interval is greater than 720. In certain embodiments, the battery test interval is set to 10,000.

In step 520, Applicants' method provides power to the receiver and the controller for L seconds, wherein L is less than or equal to J. In certain embodiments, step 520 is performed by a controller, such as controller 220. Table 3 recites the lifetimes for certain batteries when J equals 5, more specifically when controller 220 and receiver 240 require 5 ms to power up and then operate at a 100 percent duty cycle for 5 seconds. Table 4 recites the lifetimes for certain batteries when J equals 10, more specifically when controller 220 and receiver 240 require 5 ms to power up and then operate at 100 percent duty cycle for 10 seconds.

TABLE 3

| BATTERY | BATTERY USEFUL TIME PERIOD (HOURS) | BATTERY USEFUL TIME PERIOD (YEARS) |
| --- | --- | --- |
| CR2032 (210 mA-hr) | 16153 | 1.8 |
| CR2430 (280 mA-hr) | 21538 | 2.4 |
| CR2450 (600 mA-hr) | 46153 | 5.2 |

TABLE 4

| BATTERY | BATTERY USEFUL TIME PERIOD (HOURS) | BATTERY USEFUL TIME PERIOD (YEARS) |
| --- | --- | --- |
| CR2032 (210 mA-hr) | 32307 | 3.6 |
| CR2430 (280 mA-hr) | 43076 | 4.9 |
| CR2450 (600 mA-hr) | 92306 | 10.5 |

In step 530, Applicants' method determines if the battery test interval counter is equal to (N). If Applicants' method determines in step 530 that the battery test interval counter is not equal to (N), then the method transitions from step 530 to step 570. Alternatively, if Applicants' method determines in step in step 530 that the battery test interval counter is equal to (N), then the method transitions from step 530 to step 540 wherein the method resets the battery test interval counter to 0.

Applicants' method transitions from step 540 to step 550 wherein the method determines if the battery voltage is greater than or equal to 2 volts. If the method determines in step 550 that the battery voltage is greater than or equal to 2 volts, then the method transitions from step 550 to step 570. Alternatively, if the method determines in step 550 that the battery voltage is not greater than or equal to 2 volts, then the method transitions from step 550 to step 560 wherein the method causes a light emitting device, such as light emitting device 272, to flash a red light.

Applicants' method transitions from step 560 to step 570 wherein Applicants' method determines if the receiver detects a wireless signal comprising the identifier. In certain embodiments, step 570 is performed by controller 220. If Applicants' method determines in step 570 that the receiver does not detect a wireless signal comprising the identifier, then the method transitions from step 570 to step 590.

If Applicants' method determines in 570 that the receiver detects a wireless signal comprising the identifier, then the method transitions from 570 to 580 wherein the method provides power to each of the one or more alert devices disposed in the client device. In certain embodiments, 580 causes a light emitting device, such as LED 274 to emit a green light, and/or audio device 260 to emit an audible tone.

In certain embodiments, Applicants' method provides power to each of the one or more alert devices disposed in Applicants' client device for a minimum of five (5) seconds. In certain embodiments, Applicants' method provides power to each of the one or more alert devices disposed in Applicants' client device for ten (10) seconds. In certain embodiments, Applicants' method provides power to each of the one or more alert devices disposed in Applicants' client device for more than ten (10) seconds.

Applicants' method transitions from 580 to 590 wherein the method increments the battery test interval counter by unity. In certain embodiments, 590 is performed by controller 220.

Applicants' method transitions from 590 to 595 wherein the method discontinues power to the client device, where after power is not provided to the controller or the receiver for J seconds. Applicants' method transitions from 595 to 520 and continues as described herein.

Figure 4:
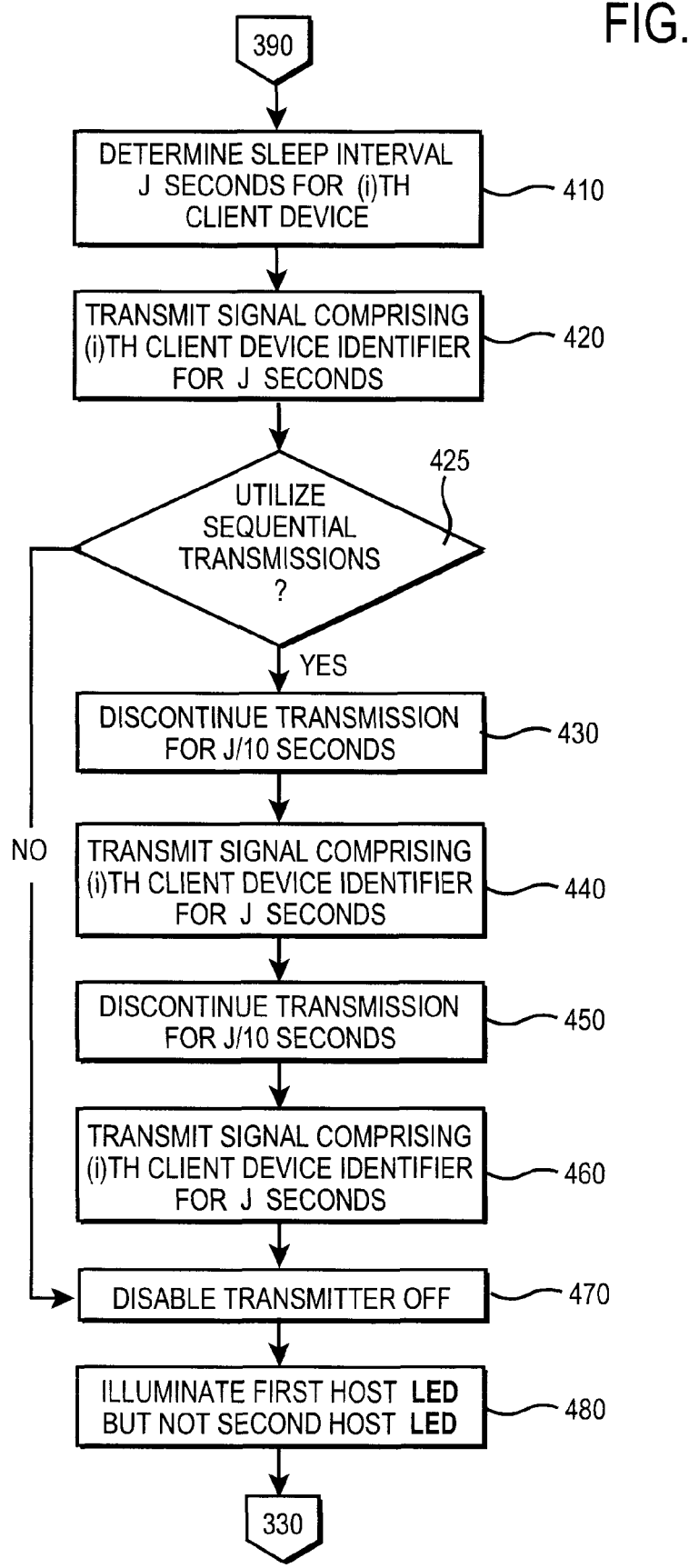
FIG. 4 is a flow chart summarizing additional steps of Applicants' method.

The individual steps recited in FIGS. 3, 4, and/or 5, may be combined, reordered, or eliminated.

While the preferred embodiments of the present invention have been illustrated in detail, it should be apparent that modifications and adaptations to those embodiments may occur to one skilled in the art without departing from the scope of the present invention.

We claim:

1. An apparatus to locate an article, comprising:
   a host device comprising a transmitter;
   a client device attached to said article, said client device comprising a client controller, a receiver interconnected with said client controller, a battery interconnected with both said client controller and said receiver,
   wherein said client controller and said receiver continuously alternate between an inactive mode for J seconds and an active mode for L seconds, wherein J is greater than or equal to L, wherein said client controller draws power at 1.6 microamps from said battery when in said inactive mode, and wherein said receiver draws power at 100 nano amps from said battery when in said inactive mode.

2. The apparatus of claim 1, wherein L and J are each 5.

3. The apparatus of claim 1, wherein J is equal to two times L.

4. The apparatus of claim 3, wherein J is 10 and wherein L is 5.

5. The apparatus of claim 1, further comprising:
   a first alert device capable of producing an audible tone, said first alert device being interconnected with said client controller;
   a second alert device capable of emitting light in the visible spectrum, said second alert device being interconnected with said client controller.

6. The apparatus of claim 5, wherein said first alert device comprises a piezoelectric element.

7. The apparatus of claim 5, wherein said first alert device comprises an electromagnet.

8. The apparatus of claim 5, wherein said first alert device comprises two light emitting diodes.

9. A method to locate an article, comprising the steps of:
   supplying a client locator device comprising a client controller, a receiver interconnected with said client controller, an alert device interconnected with said client controller, and a battery comprising a voltage and interconnected with both said client controller and said receiver;
   attaching an article to said client locator device;
   continuously alternating said client controller between an inactive mode for J seconds and an active mode for L seconds, wherein J is greater than or equal to L, wherein said client controller draws 1.6 microamps of power from said battery when in said inactive mode, and wherein said receiver draws 100 nano amps from said battery when in said inactive mode;
   determining by said client controller when said client controller is in said active mode if an receiver detects a wireless signal comprising said identifier;
   operative if said receiver detects a wireless signal comprising said identifier, providing power to said alert device;
   operative if said receiver does not detect a wireless signal comprising said identifier, discontinuing the supply of power to said receiver and to said client controller.

10. The method of claim 9, wherein
    said providing power step further comprises supplying power to said receiver for L seconds;
    said discontinuing the supply of power step further comprises not supplying power to said receiver for J seconds; and.

11. The method of claim 10, wherein J equals 5 and L equals 5.

12. The method of claim 10, wherein J equals two times L.

13. The method of claim 12, wherein J equals 10 and L equals 5.

14. The method of claim 9, wherein said supplying a client locator device step further comprises supplying a client locator device wherein said alert device comprises a light emitting diode assembly interconnected with said client controller.

15. The method of claim 14, wherein said supplying a client locator device comprising a light emitting diode assembly step further comprises supplying a client locator device comprising a light emitting diode assembly comprising a first light emitting diode capable of emitting a first color, and a second light emitting device capable of emitting a second color, wherein said first color differs from said second color.

16. The method of claim 9, wherein said supplying a client locator device step further comprises supplying a client locator device comprising a second alert device interconnected with said client controller.

17. The method of claim 9, wherein said client locator device further comprises a battery test interval counter, and wherein said battery comprises said voltage, further comprising the steps of:
    establishing a battery test interval (N);
    determining if said battery test interval counter equals (N);
    operative if said battery test interval counter equals (N), determining if the battery voltage is greater than or equal to 2 volts;
    operative if the battery voltage is not greater than or equal to 2 volts, activating said alert device.

18. The method of claim 17, further comprising the step of if said battery test interval counter equals (N), setting said battery test interval counter to 0.

19. The method of claim 17, further comprising the step of if said battery test interval counter does not equal (N), incrementing said battery test interval counter by unity.

20. The method of claim 9, further comprising the steps of:
    supplying a host device comprising a host controller and a transmitter;
    determining by said host controller said identifier;
    transmitting a wireless signal comprising said client identifier.

* * * * *

UNITED STATES PATENT AND TRADEMARK OFFICE
CERTIFICATE OF CORRECTION

| | | |
|---|---|---|
| PATENT NO. | : 7,786,859 B2 | |
| APPLICATION NO. | : 11/669864 | |
| DATED | : August 31, 2010 | |
| INVENTOR(S) | : David E. Fousse and Roy Froid | |

It is certified that error appears in the above-identified patent and that said Letters Patent is hereby corrected as shown below:

Claim 9, Col. 10, line 2, ...troller is in said active mode if [an] --said-- receiver detects a....

Claim 9, Col. 10, line 5, ...ing [said] --an-- identifier, providing power to said alert device:

Signed and Sealed this

Thirteenth Day of December, 2011

David J. Kappos
*Director of the United States Patent and Trademark Office*